United States Patent [19]

Matsuda et al.

[11] Patent Number: 5,794,116
[45] Date of Patent: Aug. 11, 1998

[54] WIRELESS VIDEO DISTRIBUTION SYSTEM WHICH AVOIDS COMMUNICATION PATH CONGESTION

[75] Inventors: Taku Matsuda, Ikoma-gun; Yoshinori Watanabe, Osaka; Tetsuya Wada, Suita; Yoshinori Gunji, Moriguchi; Shinako Nishioka, Soraku-gun; Takumi Tanabe, Osaka, all of Japan

[73] Assignee: Matsushita Electric Industrial Co., Ltd., Osaka, Japan

[21] Appl. No.: 511,853

[22] Filed: Aug. 7, 1995

[30] Foreign Application Priority Data

Aug. 9, 1994 [JP] Japan ................................. 6-187476
May 9, 1995 [JP] Japan ................................. 7-110682

[51] Int. Cl.$^6$ .............................. H04H 1/00; H04N 7/14
[52] U.S. Cl. ............................ 455/5.1; 348/7; 348/12; 455/4.2
[58] Field of Search ......................... 348/1–4, 6–13; 455/2, 3.1, 3.2, 4.1, 4.2, 5.1, 6.1, 6.2; H04N 7/10, 7/12, 7/14, 7/173, 7/20

[56] References Cited

U.S. PATENT DOCUMENTS

| | | | |
|---|---|---|---|
| 4,750,036 | 6/1988 | Martinez | 348/12 |
| 5,101,267 | 3/1992 | Morales-Garza | 358/84 |
| 5,172,413 | 12/1992 | Bradley et al. | 380/20 |
| 5,226,177 | 7/1993 | Nickerson | 455/2 |
| 5,325,419 | 6/1994 | Connolly et al. | 379/60 |
| 5,383,112 | 1/1995 | Clark | 364/401 |
| 5,388,101 | 2/1995 | Dinkins | 348/12 |
| 5,633,876 | 5/1997 | Dinkins | 370/315 |

FOREIGN PATENT DOCUMENTS 4-332284 11/1992 Japan ........................... H04N 7/00

*Primary Examiner*—Mark R. Powell
*Assistant Examiner*—John W. Miller
*Attorney, Agent, or Firm*—Wenderoth, Lind & Ponack, L.L.P.

[57] ABSTRACT

A wireless video terminal (17) creates a control signal for requesting video data. This control signal includes the type of the requested video data, a method of transmitting the video data, a position registration request and the like. The wireless video terminal (17) requests the video data by transmitting this control signal to a video server (11) through a base-station for control-data (19) and a network (13). The video server (11) transmits the requested video data to the wireless video terminal (17) requesting the video data through a designated channel, via the network (13), a router for video-data (14) and a base-station for video-data (15).

12 Claims, 13 Drawing Sheets

FIG. 11

| TERMINAL ID | BASE-STATION FOR VIDEO-DATA ID | PROGRAM NUMBER | USED CHANNEL NUMBER | POSITION INFORMATION REGISTRATION FLAG | TRANSMISSION DATA |
|---|---|---|---|---|---|
| ...... | ...... | ...... | ...... | ...... | ...... |
| ...... | ...... | ...... | ...... | ...... | ...... |

WIRELESS VIDEO DISTRIBUTION SYSTEM WHICH AVOIDS COMMUNICATION PATH CONGESTION

BACKGROUND OF THE INVENTION

1. Field of the Invention

The present invention relates to a wireless visual communication system, and more particularly, it relates to a wireless visual communication system which can avoid congestion on communication paths which is caused by a large quantity of video data from a video server/video servers and control signals from a number of terminal stations.

2. Background of the Invention

FIG. 13 is a block diagram showing a typical structure of a conventional wireless visual communication system. Referring to FIG. 13, the wireless visual communication system comprises a video server 121, a router for video-data 123 which is connected to the video server 121 through a network 122, a plurality of wireless LAN base stations 124, and a plurality of wireless video terminals 125. Each wireless LAN base station 124 has its own zone 126, and can communicate with only a wireless video terminal 125 which is present in the zone 126. However, each wireless video terminal 125 is movable over all zones 126, and can communicate with the wireless LAN base stations 124 having these zones 126. With reference to FIG. 13, the structures of the respective parts forming the conventional wireless visual communication system are now described in more detail.

The video server 121 transmits a video program menu including title information, for example, title of video, to each wireless LAN base station 124, so that each wireless video terminal 125 can receive the video data provided by the video server 121. The video server 121 also distributes video data to each wireless video terminal 125, in response to its request. The network 122 transmits the video program menu and the video data which are sent by the video server 121 to the router for video-data 123. The network 122 further transmits a control signal sent by the router for video-data 123 to the video server 121.

The router for video-data 123 relays the video program menu and the video data which are transmitted through the network 122 for each wireless LAN base station 124, in accordance with contents thereof. Namely, the router for video-data 123 includes a switching function. The router for video-data 123 also receives control signals from each wireless LAN base station 124, which is originally sent by the wireless video terminals 125. And the router for video-data 123 transmits the received control signal to the video server 121.

Each wireless LAN base station 124 directly distributes the video program menu and the video data to each wireless video terminal 125. Each wireless LAN base station 124 also receives the control signals from the wireless video terminal 125 which is located in its own zone 126, and transmits the received control signals to the router for video-data 123. A user who uses the wireless video terminal 125 selects information of video from the video program menu distributed by the wireless LAN base station 124. In accordance with his/her operation, wireless video terminal 125 sends a control signal including the request of the information to the video server 121, to the wireless LAN base station 124.

In relation to the wireless visual communication system having the aforementioned structure, a procedure for distribution of video data from the video server 121 to each wireless video terminal 125 is now described in detail.

The video server 121 transmits video program menu including title information with the same interval to the router for video-data 123 through the network 122. The router for video-data 123 distributes the received video program menu to every wireless LAN base station 124. Thereafter the router for video-data 123 transmits the video program menu to each wireless LAN base station 124. Each wireless LAN base station 124 transmits the received video program menu to its own zone 126.

A wireless video terminal 125 entering a certain zone 126 receives video program menu which is transmitted by the wireless LAN base station 124. When the received video program menu includes title information showing the video information which a user of the wireless video terminal 125 wants to watch, the wireless video terminal 125 transmits a control signal requesting this video data to the wireless LAN base station 124. The control signal is transmitted to the video server 121, traveling through the wireless LAN base station 124, the router for video-data 123 and the network 122. The video server 121 recognizes the user's request from the received control signal and transmits the corresponding video information. This video data is distributed to the wireless video terminal 125 through the network 122, the router for video-data 123 and the wireless LAN base station 124.

In the conventional wireless visual communication system, as hereinabove described, each wireless LAN base station 124 transmits/receives video data as well as control signals. However, each wireless LAN base station 124 cannot simultaneously transmit/receive the video data and the control signal, which are transmitted through the same communication path. Every time the control signal is received, therefore, the wireless LAN base station 124 must interrupt transmission/receiving of video data, to transmit the control signal. This leads to reduction of the throughput for the video data, and interruption of a picture received in the wireless video terminal 125. This problem is serious particularly when a number of wireless video terminals 125 are present in the same zone 126 and these terminals 125 simultaneously transmit control signals.

The video data is extremely larger in amount than the control signal. Therefore, in the conventional wireless visual communication system transmitting these data through the same communication path, the band which is allotted to the communication path is not effectively utilized. A CPU which is provided in each wireless LAN base station 124 may be replaced by a high-speed one to increase the transmission speed for the video data thereby preventing interruption of the picture received by each wireless video terminal 125. However, this method is hard to implement due to increase of the system cost.

Further, in the conventional wireless visual communication system, the control signal is transmitted to the video server 121 regardless of the traffic of video data on the network 122. Therefore, when a number of wireless video terminals 125 transmit control signals to the video server 121 substantially at the same time, the video server 121 must control distribution of a number of video data in response to the control signals. However, the video data has such a large amount that the traffic is soon increased on the network 122 and the distribution of the video data is hard to control. In other words, the video server 121 is congested. Thus, the burden on the video server 121 is increased in the conventional wireless visual communication system.

Even if a wireless video terminal receiving video data in one zone 126 moves to another zone 126, the video server 121 cannot recognize such movement and continuously transmits the video data to the previous zone 126. Therefore, the wireless video terminal 125 moving to another zone 126 cannot receive this video data. Thus, the video server 121 transmits the video data in vain.

For reference, some of other visual communication systems which have been proposed are now described.

(1) Japanese Patent Laying-Open No. 4-332284 (1992)

A device which is disclosed in this gazette stores accessory signals such as an order line signal, a supervisory control signal and a line transfer signal in the same baseband as a video signal for transferring the same. However, when digital video data is transmitted by radio, an extremely wide transmission band is required and it is difficult to multiplex and transmit control signal in addition to the video data.

(2) U.S. Pat. No. 5,325,419

This gazette discloses such a system that a radio station which communicates with a portable terminal using radio-wave is connected with an ISDN (Integrated Service Digital Network) line, thereby transmitting voices, data and images. However, in this system, the band is insufficient for transmission of high-quality images since the voices, the data and the images are multiplexed on a single communication line for transmission.

(3) U.S. Pat. No. 5,172,413

This gazette discloses a system of hierarchically dispersing and storing video data in relation to users' access frequencies, for providing the video data in response to requests from a plurality of users. However, in this system, it is premised that the transmission medium is a wired network, in which users' terminals are fixed and not freely portable.

(4) U.S. Pat. No. 5,101,267

This gazette discloses a system of analyzing users' requests in real time by satellite broadcasting, for responding to the requests. In this system, video data and control signal are transmitted from different base stations, while the video data and the control signal are transmitted to the respective base stations in the same radio band. The different radio band is used in accordance with contents, for example, relatively wide and narrow bands being alloted to the video data and control signal respectively. Therefore, it is a waste of the radio band.

SUMMARY OF THE INVENTION

An object of the present invention is to provide a wireless visual communication system which can improve the throughput for video data without increasing the cost for the system.

Another object of the present invention is to provide a wireless visual communication system which can prevent increase of the traffic on a network resulting from concentration of control signals, thereby reducing the burden on a video server.

Still another object of the present invention is to provide a wireless visual communication system which can position-control each wireless video terminal, thereby reducing the burden on a video server.

The present invention is directed to a wireless visual communication system for distributing various video data to a movable terminal station using a wireless medium. This wireless visual communication system comprises a video server, a base-station for video-data and a base-station for control-data. The video server stores a plurality of types of video data. The base-station for video-data is connected with the video server through a network for transmitting the video data supplied from the video server to the terminal station through a first radio communication path. The base-station for control-data receives control signals transmitted from the terminal station through a second radio communication path and informs the video server of the control signal. The terminal station transmits the control signal to the base-station for control-data to inform the video server of its request for video information and the type of the requested video information. The video server retrieves the corresponding video data on the basis of the control signal received from the base-station for control-data, and transmits the requested video information to the network. Relatively wide and narrow bands are allotted to the first and second radio communication paths respectively. Thus, the video data and the control signal are transmitted through different radio communication paths. Therefore, the base-station for video-data need not to process the control signal, and can transmit/receive the video data without interruption. Consequently, the base-station for video-data can effectively utilize the band which is allotted thereto, thereby preventing reduction of the throughput for the video data.

When a plurality of communication channels are available for the base-station for video-data in the first radio communication path for transmission of video data, the terminal station designates the communication channel for receiving the video data by transmitting the control signal. In this case, the base-station for video-data supervises current conditions of the communication channels, and the base-station for control-data inquires of the base-station for video-data about whether or not the communication channel which is designated by the control signal is available upon receiving of the control signal. The base-station for control-data transmits the control signal to the video server if the designated communication channel is available, while the base-station for control-data requires the terminal station to re-set a communication channel for receiving if the designated one is busy. The base-station for video-data transmits the video data received from the video server to the terminal station through the communication channel designated by the terminal station. Thus, the video server may not distribute the video data beyond the ability of the communication channels, whereby the video server can be prevented from congestion and proper traffic can be maintained on the network.

In a general application, a plurality of base-stations for video-data are set up with specific communicable zones respectively. The base-station for control-data can make communication in an area covering the zones of all base-stations for video-data. In this case, a frequency band not overlapping with other ones is fixedly allotted to each base-station for video-data as the first radio communication path. Each base-station for video-data transmits video data through a plurality of communication channels which are obtained by dividing the fixedly allotted frequency band. Thus, a number of terminal stations can request video data.

In a preferred embodiment, menu storage means is further provided. This menu storage means, which is connected with each base-station for video-data, stores title information of the video data stored in the video server. In this case, each base-station for video-data transmits a video program menu which is created on the basis of the title information stored in the menu storage means, an identification value allotted to each base-station for video-data, and conditions of the communication channels in the first radio communication path, to its zone through a predetermined communication channel in the first radio communication path. The terminal station creates a control signal by referring to the video program menu, the identification value and the conditions of the communication channels as received.

Preferably, the control signal includes a video data number part storing an identification value for specifying video data which distribution is requested to the video server, a terminal station ID part storing an identification value which is specific to the terminal station, a first transmission/receiving station ID part storing the identification value of the base-station for video-data transmitting the video program menu, and a used channel designating part designating the communication channel for receiving the requested video data. In this case, the base-station for control-data inquires of the base-station for video-data, having the identification value which is stored in the first transmission/receiving station ID part of the control signal, about whether or not the communication channel stored in the used channel designating part is available. The base-station for control-data orders the terminal station having the identification value which is stored in the terminal station ID part of the control signal to reset a communication channel if the communication channel is unavailable, while the base-station for control-data transfers the control signal to the video server if the communication channel is available. The video server refers to the video data number part of the received control signal, to retrive the corresponding video data and transmit the video information to the network.

In the preferred embodiment, further, position information storage means is provided. This position information storage means stores pairs of the identification value of the terminal station and the identification value of the base-station for video-data which are included in the control signal received by the video server from the base-station for control-data. By using these values stored in the position information storage means, the video server can learn the current position of each terminal. Consequently, the video server can quickly and reliably distribute video data to a terminal station which moves from one zone to another.

The control signal may also include a position information registration flag part for informing the video server of whether registration of the position information stored in the position information storage means is necessary to be registered or to be deleted. In this case, the video server refers to the position information registration flag part which is included in the received control signal, and changes the contents of the position information storage means. Thus, the video server carries out no updating of unnecessary position information.

Preferably, the video server deletes the position information of the terminal station from the position information storage means when the video server recognizes that the terminal station is not positioned in any zone on the basis of the value in the position information registration flag part which is included in the received control signal. Thus, it is possible to stop distribution of video data in a zone in which the terminal station has been precedently positioned. In other words, the video server can control waste distribution of video data, to effectively use a finite number of the communication channels.

In the preferred embodiment, in addition, history storage means is provided for storing the history of control signals received by the video server as history information. Due to storage of such history information, the present invention can be applied to investigation and statistics of numbers of access times, tabulation of questionnaires and the like.

In another preferred embodiment, a plurality of base-stations for control-data are provided to have specific communicable areas respectively. Further, a control unit is provided for creating a terminal station control signal which controls each terminal station and transmitting this terminal station control signal through each base-station for control-data. This control unit provides the identification value which is common to all terminal stations, so that the control unit can control all terminal stations which are positioned in the communicable areas of all base-stations for control-data with one terminal station control signal. In other words, it is possible to integrally control a number of terminal stations with a single terminal station control signal. Consequently, the traffic on the network is reduced.

The terminal station control signal preferably includes an identification value storage part for storing identification values which are specific to the respective terminal stations or the common identification value, and a data storage part for storing data for controlling the respective terminal stations. The control unit independently controls the respective terminal stations through the terminal station control signal including the identification values which are specific to the respective terminal stations, while batch-controlling all terminal stations which are positioned in the communicable areas of all base-stations for control-data through the terminal station control signal including the common identification value. Thus, the control unit can independently control the terminal stations, as well as control all terminal stations, at need.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 illustrates history information which is stored in a history storage table part 20 in the wireless visual communication system shown in FIG. 6;

DESCRIPTION OF THE PREFERRED EMBODIMENTS

Figure 1:
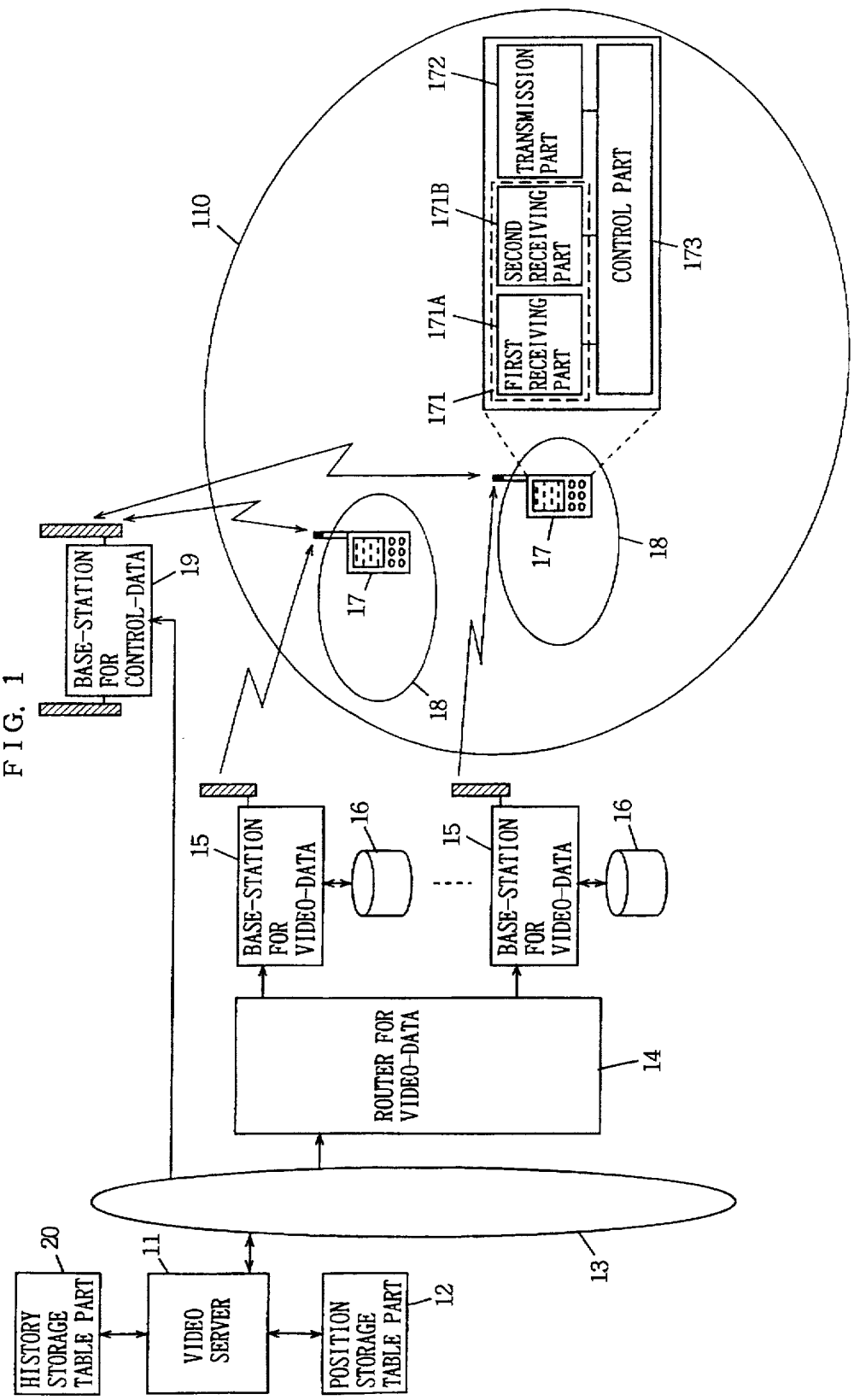
FIG. 1 is a block diagram showing the overall structure of a wireless visual communication system according to an embodiment of the present invention.

FIG. 1 is a block diagram showing the overall structure of a wireless visual communication system according to a first embodiment of the present invention. Referring to FIG. 1, this wireless visual communication system comprises a video server 11, a position storage table part 12 which is connected with the video server 11, a router for video-data 14 which is connected with the video server 11 through a network 13, a plurality of base-stations for video-data 15, menu storage parts 16 which are connected with the base-stations for video-data 15, a plurality of wireless video terminals 17, a base-station for control-data 19, and a history storage table part 20 which is connected with the video server 11. While FIG. 1 illustrates only a single base-station for control-data 19, a proper number of such base-stations for control-data 19 may be set up in response to the scale of the wireless visual communication system. The structures of the respective parts of the wireless visual communication system according to the embodiment of the present invention are now described with reference to FIG. 1.

In response to a request from each wireless video terminal 17, the video server 11, storing a plurality of types of video data, retrieves the corresponding video data and distributes the video information to the wireless video terminal 17. The video server 11 employs the position storage table part 12 (see FIG. 5), in order to learn zones 18 in which the respective wireless video terminals 17 are currently positioned. The position storage table part 12 is described later in detail. The network 13 transmits various types of information employed in this wireless visual communication system. The router for video-data 14 transmits the various types of information transmitted through the network 13 to a base-station for video-data 15 which is the destination of the information.

The menu storage part 16 which is connected with each base-station for video-data 15 stores information such as titles of video data which can be distributed to the zone 18 provided for each base-station for video-data 15. Each base-station for video-data 15 creates a video program menu packet 31 (see (a) in FIG. 3) including the information stored in the menu storage part 16, and transmits the same to the zone 18 corresponding to the base-station for video-data 15. The base-station for video-data 15 also creates a video data packet 32 (see (b) in FIG. 3) including video data which is requested by each wireless video terminal 17 to the video server 11, and transmits the packet to the wireless video terminal 17 requesting the video data through a channel which is not used (see FIG. 2).

Each wireless video terminal 17 includes a receiving part 171, a transmission part 172, and a control part 173. The receiving part 171 includes a first receiving part 171A for receiving the video program menu packet 31 and the video data packet 32 which are transmitted from the base-station for video-data 15, and a second receiving part 171B for receiving a control signal which is transmitted from the base-station for control-data 19. The control part 173 displays a program menu which is included in the video program menu packet 31 and video data which is included in the video data packet 32 on a display (not shown). When the user carrying this wireless video terminal 17 wants to receive video data, he manipulates an input console (not shown) such as a keyboard, for instructing the control part 173 to request the video data to the video server 11. The control part 173 creates a control signal packet 41 (see FIG. 4) including this request, and transmits the packet to the base-station for control-data 19 from the transmission part 172.

The base-station for control-data 19 receives the control signal packet 41 from the wireless video terminal 17. Then the base-station for control-data 19 transmits this control signal packet 41 to the video server 11 through the network 13, as well as to the base-station for video-data 15 controlling the zone 18 to which the wireless video terminal 17 creating the control signal packet 41 belongs. The base-station for control-data 19 has a terminal station controllable area 110. This terminal station controllable area 110 covers all zones 18, so that every wireless video terminal 17 can be position-controlled even if some of the wireless video terminals are in a position incapable of receiving the video program menu packets 31 from all base-stations for video-data 15.

Figure 2:
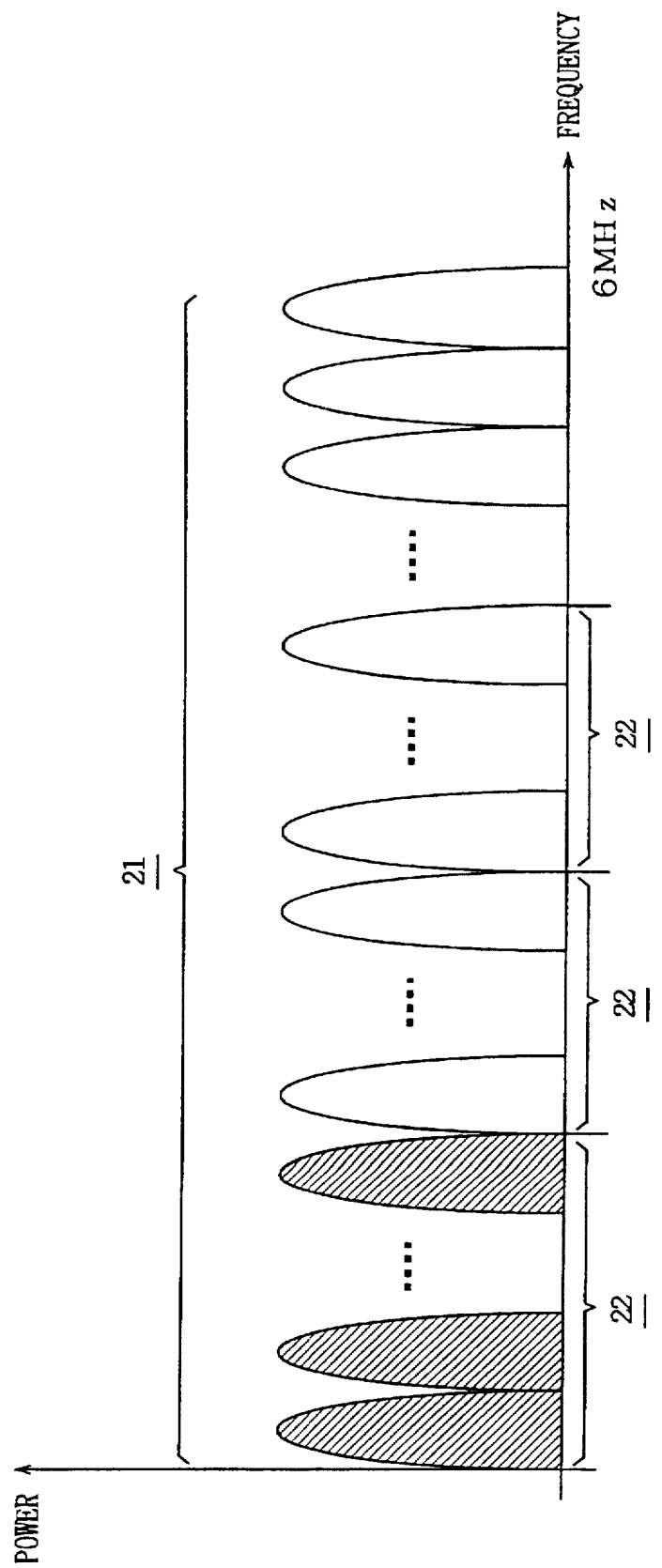
FIG. 2 illustrates the frequency spectrum of information which is distributed from a base-station for video-data 15 to a wireless video terminal 17 in the wireless visual communication system shown in FIG. 1.

FIG. 2 illustrates a frequency spectrum 21 of a transmission signal (transmitting the video program menu packet 31 or the video data packet 32) emitted by each base-station for video-data 15 shown in FIG. 1. In the wireless visual communication system according to this embodiment, a frequency band of 6 MHz is allotted to every base-station for video-data 15, so that the frequency band will not overlap with other ones. This frequency band includes 512 carrier waves, so that each channel 22 is formed by 40 carrier waves. In response to a request from each wireless video terminal 17, the video server 11 multiplexes video data which is compressed by an MPEG (motion picture experts group) of 1.5 Mbps in an OFDM (orthogonal frequency division multiplexing) modulation, for example. The base-station for video-data 15 transmits the video data packet 32 to the wireless video terminal 17 requesting the video data through an unused channel 22. On the other hand, the video program menu packet 31 is transmitted to the zone 18 through a previously set channel 22.

The information may alternatively be transmitted from a base-station for video-data to a wireless video terminal 17 in the form of an amplitude-modulated or frequency-modulated analog signal. Further, the information may be transmitted through an optical signal which is prepared by modulating infrared radiation.

Figure 3:
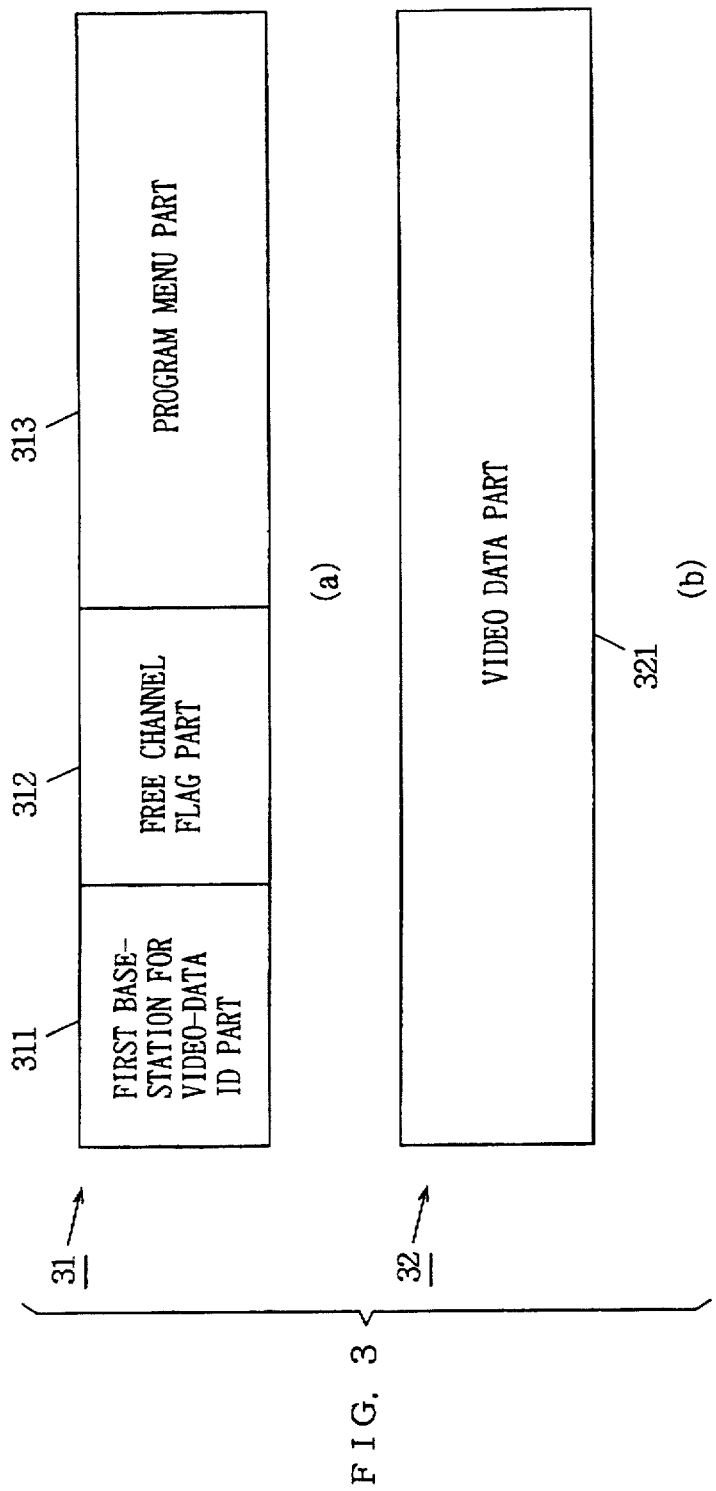
FIG. 3 illustrates formats of a packet which is distributed from the base-station for video-data 15 to the wireless video terminal 17 in the wireless visual communication system shown in FIG. 1.

FIG. 3 shows a format of the video program menu packet 31 and the video data packet 32 which are transmitted by a base-station for video-data 15 in detail. Referring to (a) in FIG. 3, the video program menu packet 31 includes a first base-station for video-data ID part 311, a free channel flag part 312, and a program menu part 313. An identification value not overlapping with other ones is previously allotted to each base-station for video-data 15. The first base-station for video-data ID part 311 stores this identification value, whereby the wireless video terminal 17 receiving this video program menu packet 31 can recognize the zone 18 in which the wireless video terminal is currently positioned. The free channel flag part 312 stores flag information indicating the conditions of the respective channels 22 in the frequency spectrum 21 which is allotted to the base-station for video-data 15. The wireless video terminal 17 designates an unused channel by referring to this flag information, and receives the video data packet 32 transmitted on this unused channel. The program menu part 313 stores the menu of video data which can be distributed by each base-station for video-data 15. The free channel flag part 312 in the video program menu packet 31 having the aforementioned structure is updated every time the base-station for video-data 15 distributes the video data packet 32 to the wireless video terminal 17.

Referring to (b) in FIG. 3, the video data packet 32 includes a video data part 321. This video data part 321 stores the video data which is requested by the wireless video terminal 17 to the video server 11. The wireless video terminal 17 demodulates and decodes this video data, to display the picture on the display (not shown). The video server 11 distributes this video data packet 32 on the channel 22 requested by the wireless video terminal 17. Therefore, the video data packet 32 requires no storage part for storing the identification value of the wireless video terminal 17 in particular.

Figure 4:
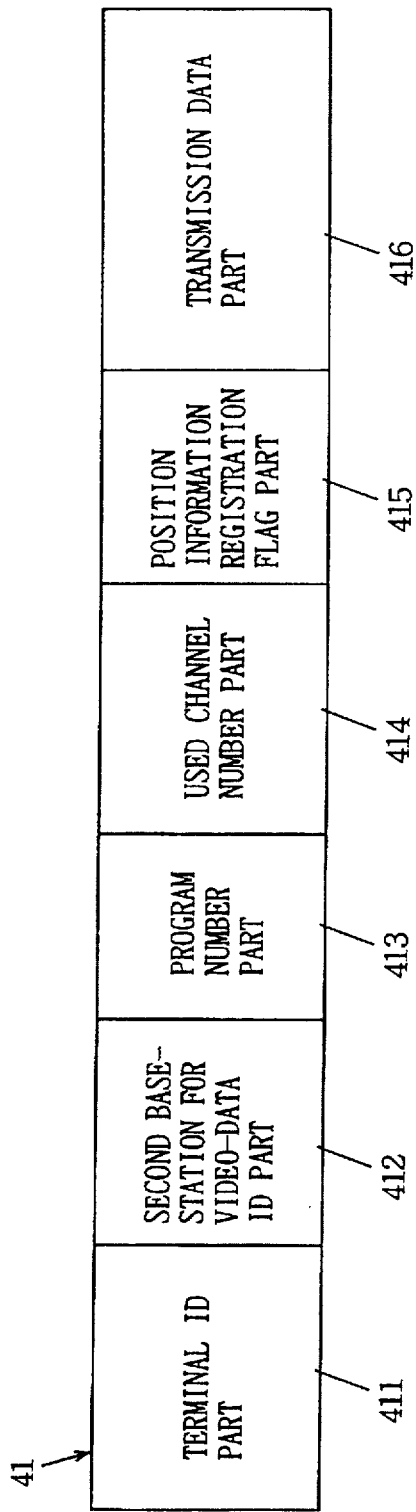
FIG. 4 illustrates the format of information which is transmitted from the wireless video terminal 17 to a base-station for control-data 19 in the wireless visual communication system shown in FIG. 1.

FIG. 4 illustrates the format of the control signal packet 41 which is transmitted from each wireless video terminal 17 shown in FIG. 1 to the base-station for control-data 19 for requesting video data to the video server 11 in detail. Referring to FIG. 4, the control signal packet 41 includes a terminal ID part 411, a second base-station for video-data ID part 412, a program number part 413, a used channel number part 414, a position information registration flag part 415, and a transmission data part 416. The terminal ID part 411 stores the identification value of the wireless video terminal 17 transmitting this control signal packet 41. The second base-station for video-data ID part 412 stores the identification value of the base-station for video-data 15 controlling the zone 18 in which the wireless video terminal 17 is currently positioned. The program number part 413 stores the identification value of the video data requested by the wireless video terminal 17. The used channel number part 414 stores identifiers such as the number of the channel 22 which is used by the wireless video terminal 17 for receiving the requested video data. The position information registration flag part 415 stores a flag indicating that the wireless video terminal 17 requests or deletes its registration of position information. The transmission data part 416 stores other items to be notified.

Figure 5:
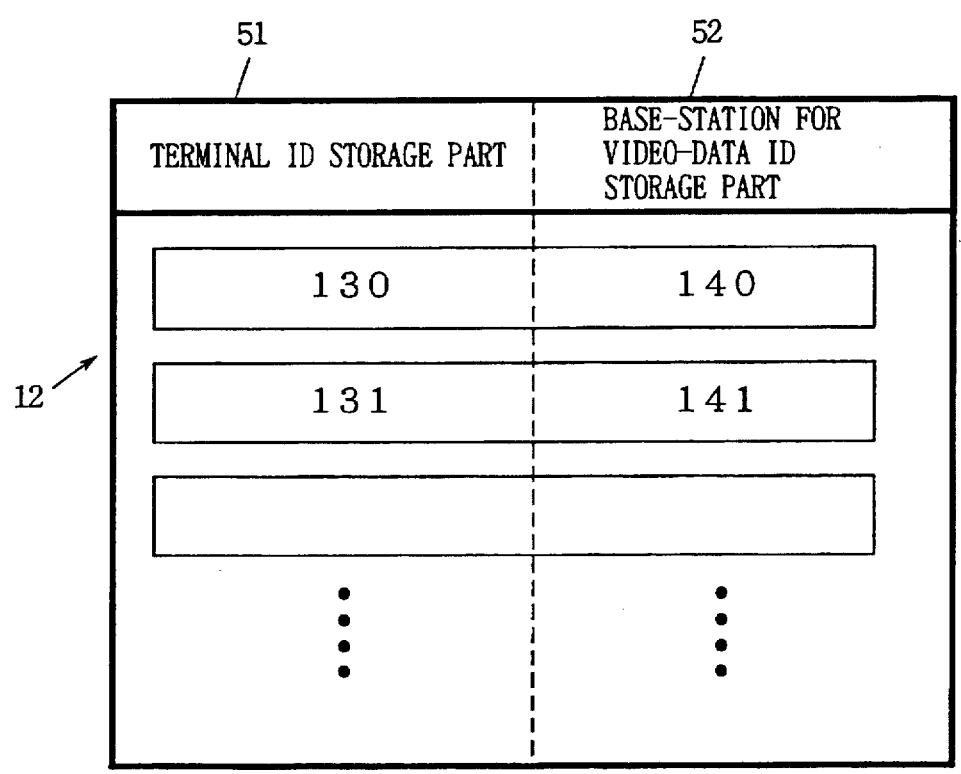
FIG. 5 illustrates position registration information which is stored in a position storage table part 12 in the wireless visual communication system shown in FIG. 1.

FIG. 5 illustrates a position control signal which is stored in the position storage table part 12 shown in FIG. 1. Referring to FIG. 5, the position storage table part 12 is employed by the video server 11 for recognizing the zone 18 in which each wireless video terminal 17 is positioned. The position control signal which is stored in this position storage table part 12 is created on the basis of the control signal packet 41 which is transmitted from each wireless video terminal 17. The position storage table part 12 includes a terminal ID storage part 51 and a base-station for video-data ID storage part 52. The terminal ID storage part 51 stores the identification value of each wireless video terminal 17. The base-station for video-data ID storage part 52 stores the identification value of the base-station for video-data 15 controlling the zone 18 in which each wireless video terminal 17, which is allocated the identification value written in the terminal ID storage part 51 next to the base-station for video-data ID storage part 52, is currently positioned.

As hereinabove described, the communication path for transmitting the control signal packet 41 from the wireless video terminal to the video server 11 (up communication path) is completely separated from the communication path for transmitting the video data packet 31 from the video server 11 to the wireless video terminal 17 (down communication path) the wireless visual communication system according to this embodiment. Further, a relatively wide band is allotted to the down communication path for transmitting the video data which size is generally large, while a relatively narrow band is allotted to the up communication path for transmitting the control signal which size is small.

Figure 6:
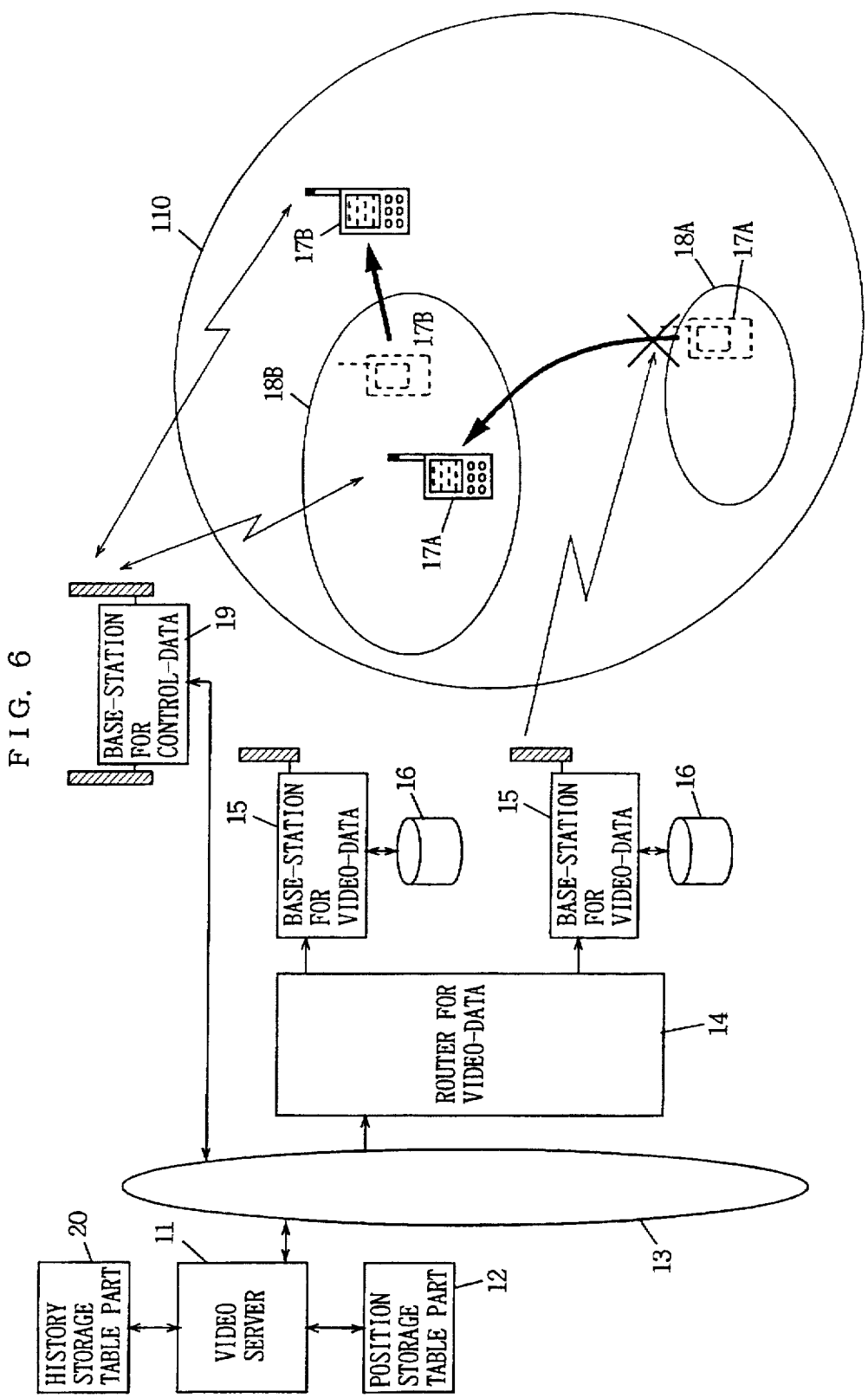
FIG. 6 illustrates a state of movement of wireless video terminals in the wireless visual communication system shown in FIG. 1.

FIG. 6 illustrates such a state that a wireless video terminal 17A moves from a zone 18A to another zone 18B while another wireless video terminal 17B moves from the zone 18B to an unreceivable area (area belonging to none of the zones 18). The term "unreceivable area" indicates an area which is included by the terminal station controllable area 110 but cannot receive the video program menu packets 31 and the video data packets 32 from any base-station for video-data 15.

Figure 7:
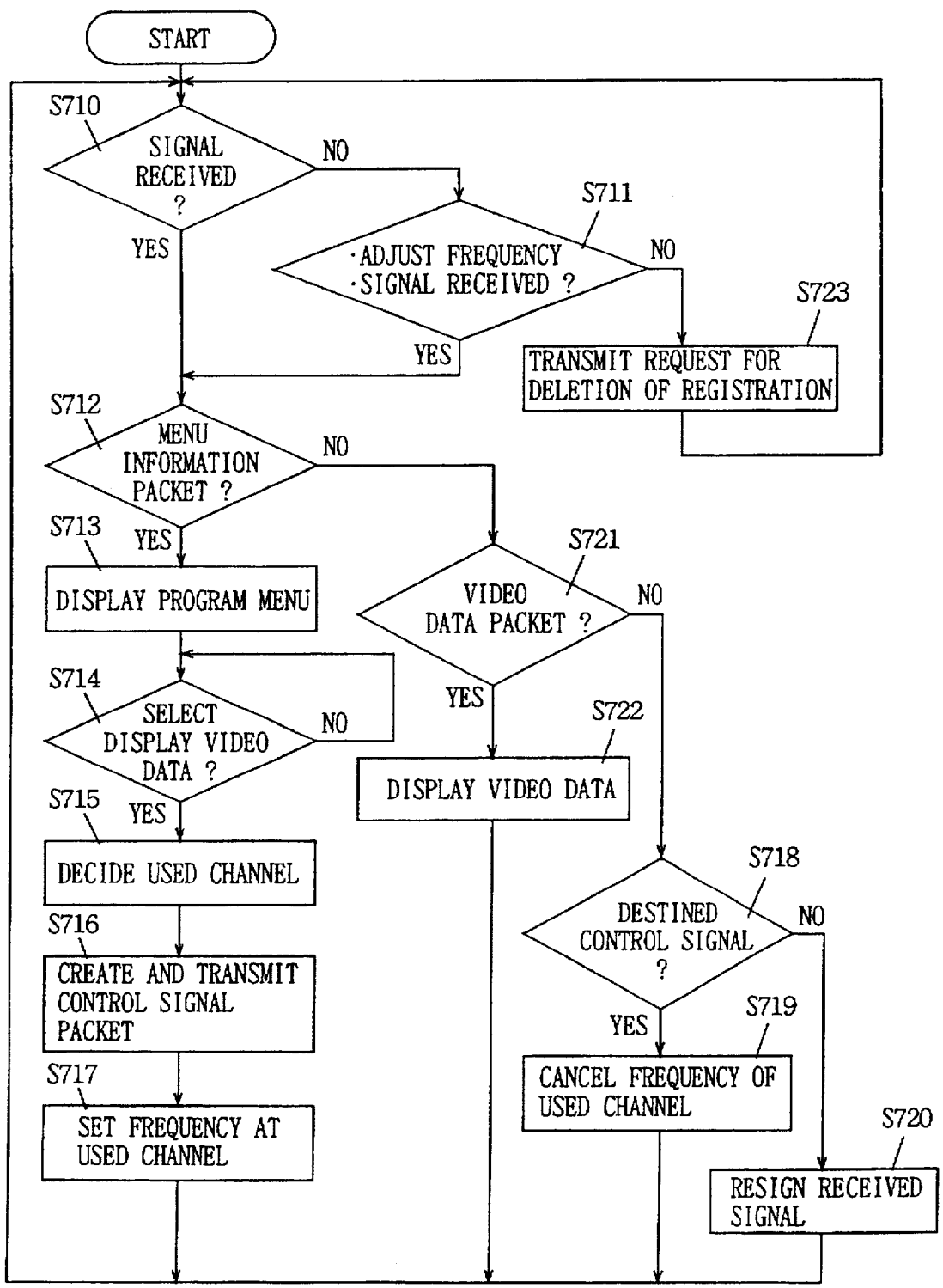
FIG. 7 is a flow chart showing an operation of the wireless video terminal in the wireless visual communication system shown in FIG. 6.
Figure 8:
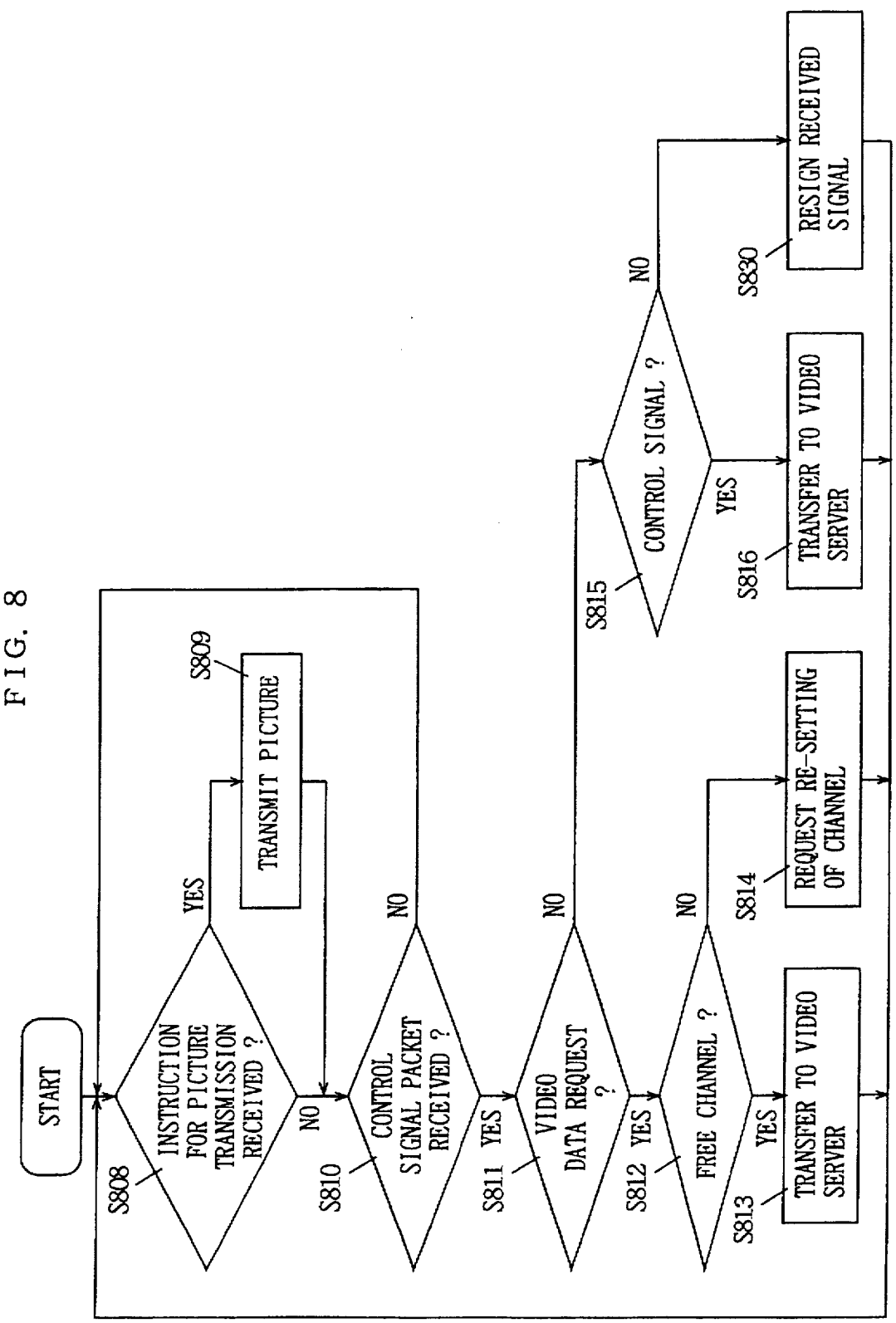
FIG. 8 is a flow chart showing an operation of a base-station for control-data in the wireless visual communication system shown in FIG. 6.
Figure 9:
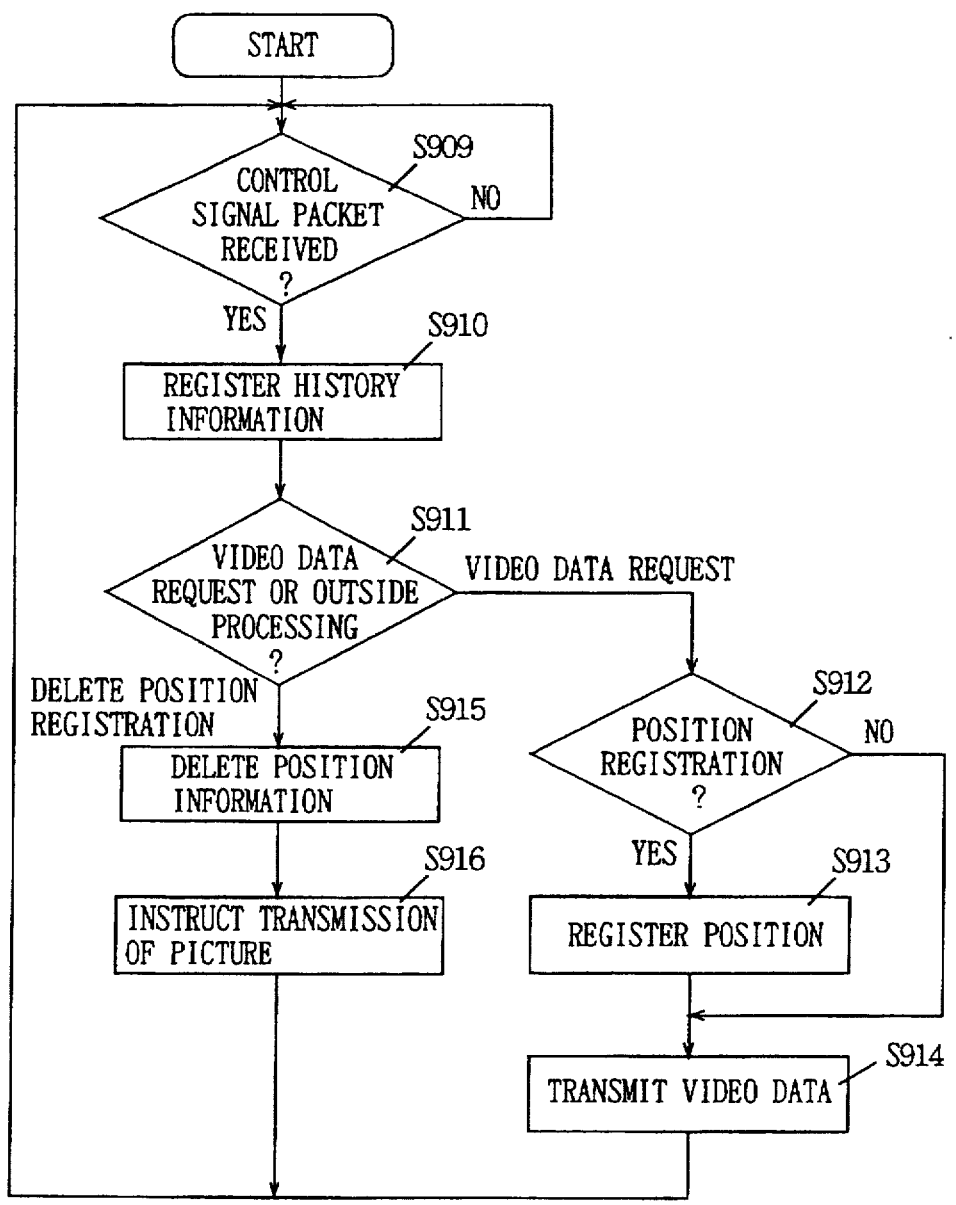
FIG. 9 is a flow chart showing an operation of a video server in the wireless visual communication system shown in FIG. 6.
Figure 10:
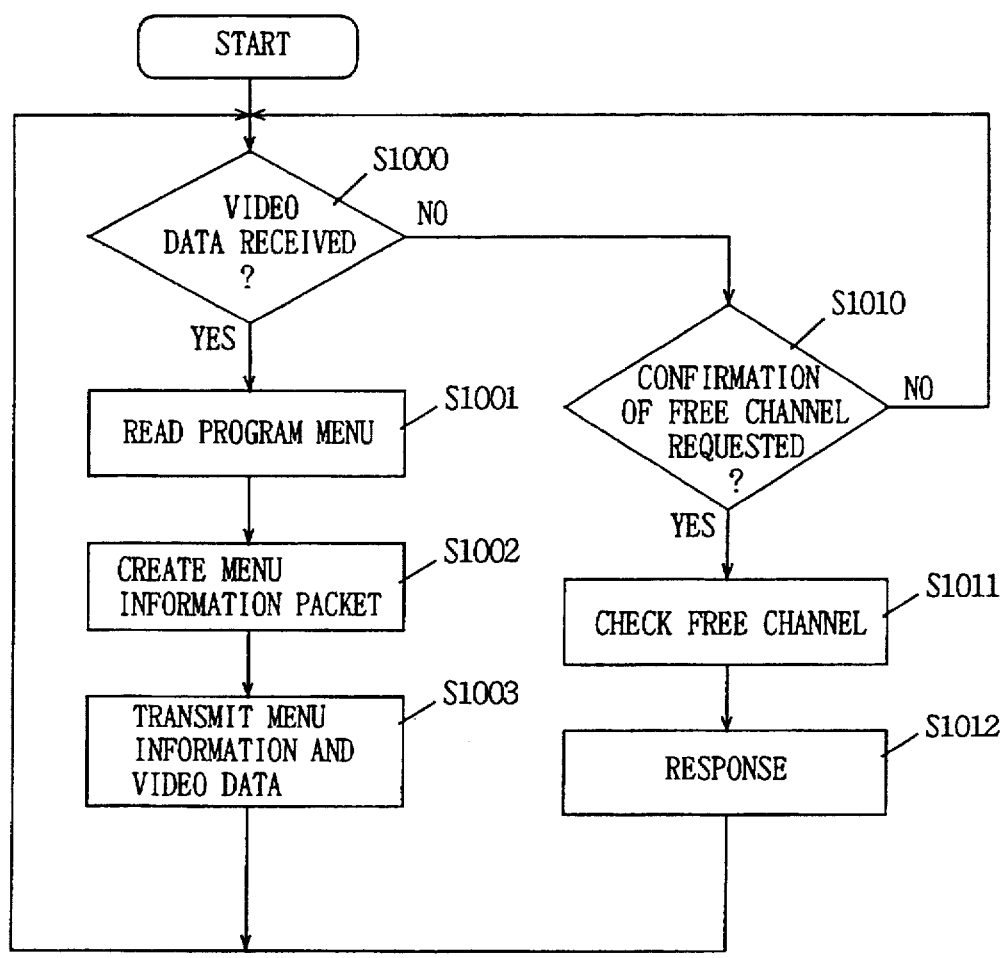
FIG. 10 is a flow chart showing an operation of the base-station for video-data in the wireless visual communication system shown in FIG. 6.

FIGS. 7 and 8 are flow charts showing operations of the wireless video terminal 17 and the base-station for control-data 19 respectively. FIGS. 9 and 10 are flow charts showing operations of the video server 11 and the base-station for video-data 15 respectively. With reference to FIGS. 1 to 10, operations of the wireless visual communication system according to the embodiment of the present invention from zone movement to acquisition of video data are now described in detail.

The base-station for video-data 15 receives the video data packet 32 from the video server 11 (step S1000 in FIG. 10), reads the program menu from its menu storage part 16 (step S1001), and creates the video program menu packet 31 (step S1002). At this time, the base-station for video-data 15 selects an unused channel from the channels 22 which are available in the zone 18 controlled by itself, and sets the unused channel flag part 312 in the video program menu packet 31 on the basis of the result of the selection. Thus, the base-station for video-data 15 transmits the free channel, which is to be used for transmitting the video data packet 32, unavailable for other wireless video terminals 17. Then, the base-station for video-data 15 transmits the created video program menu packet 31 and the received video data packet 32 to the zone 18 (step S1003). At this time, the video program menu packet 31 and the video data packet 32 are transmitted to the zone 18 through a previously fixedly set channel 22 and the channel 22 designated by the wireless video terminal 17 requesting the video data respectively.

Due to movement of the wireless video terminal 17A (see FIG. 6) from the zone 18A to the zone 18B, this wireless video terminal 17A cannot receive a signal which is transmitted by the base-station for video-data 15 controlling the zone 18A. Thus, the wireless video terminal 17A recognizes that it has gone out of the zone 18A (step S710 in FIG. 7). At this time, the wireless video terminal 17A cannot receive the video program menu packet 31 from the base-station for video-data 15 controlling the zone 18B either, due to mismatching of the receiving frequency. As hereinabove described, the video program menu packet 31 is transmitted in the frequency band which is allotted to each base-station for video-data 15 through the previously fixedly set channel 22. Therefore, the first receiving part 171A of the wireless video terminal 17A adjusts its receiving frequency, to be capable of receiving the video program menu packet 31 from the base-station for video-data 15 controlling the zone 18B (step S711). When the receiving frequency of the first receiving part 171A is matched with the frequency of channel 22 transmitting the video program menu packet 31, the wireless video terminal 17A receives the video program menu packet 31 (step S712). The wireless video terminal 17A recognizes its movement to the zone 18B on the basis of the identification value of the base-station for video-data 15 which is stored in the first base-station for video-data ID part 311 of this video program menu packet 31. The display (not shown) of the wireless video terminal 17A displays the program menu (step S713).

The user carrying the wireless video terminal 17A manipulates the input console (not shown) of the wireless video terminal 17A, to select video data to be received from the displayed program menu (step S714). In response to this, the control part 173 of the wireless video terminal 17A decides the channel 22 employed for receiving the video data packet 32 by referring to the free channel flag which is stored in the free channel flag part 312 (step S715). Then, the control part 173 creates the control signal packet 41, and the transmission part 172 transmits the packet to the base-station for control-data 19 (step S716). At this time, the control part 173 stores the identification value of the wireless video terminal 17A, that of the base-station for video-data 15 controlling the zone 18B, the program number selected by the wireless video terminal 17A, and the identifier specifying the used channel 22 in the terminal ID part 411, the second base-station for video-data ID part 412, the program number part 413 and the used channel number part 414 respectively. Further, the wireless video terminal 17A stores a request for position registration in the position information registration flag part 415 due to the movement of the zone 18. Thus, the wireless video terminal 17A informs the video server 11 of the zone to which the wireless video terminal 17A currently belongs. Then, the control part 173 of the wireless video terminal 17A matches the receiving frequency of the first receiving part 171A with the frequency of the used channel 22, to be capable of receiving the video data packet 32 including the requested video data (step S717).

The base-station for control-data 19 receives the aforementioned control signal packet 41 from the wireless video terminal 17A (step S810 in FIG. 8), and determines whether or not the program number part 413 includes a request for video data (step S811). If the control signal packet 41 includes a video data request, the base-station for control-data 19 transmits base-station for control-data control signal for confirming whether or not the used channel 22 which is stored in the control signal packet 41 is available to the base-station for video-data 15 controlling the zone 18B. The base-station for control-data control signal also includes the identification value of the destination wireless video terminal 17.

When a plurality of wireless video terminals 17 transmit the control signal packets 41 while designating the same used channel substantially at the same time, the wireless video terminal 17 subsequently transmitting the control signal packet 41 cannot use this designated channel. The base-station for video-data 15 receives the aforementioned base-station for control-data control signal (step S1010 in FIG. 10) and confirms the condition of the channel 22 (step S1011). Then, the base-station for video-data 15 transmits the result of the confirmation to the base-station for control-data 19 (step S1012).

On the basis of the response from the base-station for video-data 15, the base-station for control-data 19 determines whether or not the channel 22 which is designated by the wireless video terminal 17 for acquisition of the video data is currently available (step S812). If this channel 22 is unavailable, the wireless video terminal 17A must newly designate another channel 22, in order to acquire the video data. Therefore, the base-station for control-data 19 transmits base-station for control-data control signal including a request for re-setting of the channel 22 to the wireless video terminal 17A (step S814). If the channel 22 designated by the wireless video terminal 17A is available, on the other hand, the base-station for control-data 19 transfers the received control signal packet 41 to the video server 11 (step S813).

When the second receiving part 171B receives the aforementioned base-station for control-data control signal (step S710 in FIG. 7), the control part 173 of the wireless video terminal 17A recognizes the request for re-setting of the used channel 22, and determines whether or not the destination of this base-station for control-data control signal is itself (step S718). If the determination is YES, the control station 173 cancels the frequency of the used channel 22 which is set in the first receiving part 171A (step S719), and thereafter returns to the operation at the step S710, to re-receive the updated video program menu packet 31 and selects another available channel 22. Thereafter the control part 173 creates the control signal packet 41, transmits the packet to the base-station for control-data 19, and waits for transmission of the video data packet 32 from the base-station for video-data 15. If the determination at the step S718 is NO, on the other hand, the control part 173 discards the received base-station for control-data control signal (step S720), and returns to the operation at the step S710.

While a method of transmitting/receiving the aforementioned base-station for control-data control signal is not particularly restricted, a frequency band which is similar to that shown in FIG. 2 may be allotted to the base-station for control-data 19, to transmit/receive the base-station for control-data control signal by radio, for example. In this case, the allotted frequency band, not overlapping with the frequency band used by each base-station for video-data 15, has transmission power which is set at a larger value as compared with that of each base-station for video-data 15, to be capable of transmitting the information to the overall terminal station control area 110. The base-station for control-data 19 transmits the base-station for control-data control signal through a predetermined channel in the allotted frequency band.

The video server 11 receives the aforementioned control signal packet 41 (step S909 in FIG. 9), and stores the contents of this control signal packet 41 in the history storage table part 20 as history information (step S910). The history storage table part 20, comprising the same items as the control signal packet 41 as shown in FIG. 11, stores all information included in the control signal packet 41. The history information stored in the history storage table part 20 is referred to later, to be employed for various objects. The history information may be employed for investigation and statistics of numbers of access times, tabulation of questionnaires and the like, for example.

Then, the video server 11 determines whether or not the program number part 413 of the received control signal packet 41 includes a picture request (step S911). If a picture request is included, the video server 11 further determines whether or not the position information registration flag part 415 includes a position registration request (step S912). If a position registration request is included, the video server 11 retrieves the position storage table part 12 in order to update the position information of the wireless video terminal 17A, and registers the position of the wireless video terminal 17A (step S913). Namely, the video server 11 stores the identification value of the wireless video terminal 17A which is obtained from the terminal ID part 411 of the control signal packet 41 and the identification value of the base-station for video-data 15 which is obtained from the second base-station for video-data ID part 412 in the terminal ID storage part 51 and the video radio station ID storage part 52 respectively, thereby registering the position information of the wireless video terminal 17 in the position storage table part 12. Then, the video server 11 creates the video data packet 32 on the basis of the program number part 413 of the control signal packet 41 in order to distribute the requested video data to the wireless video terminal 17A, and transmits the packet to the network 13 (step S914). At this time, the video data packet 32 is transmitted through the channel 22 which is designated by the used channel number part 414 of the control signal packet 41 (step S922).

The base-station for video-data 15 receives the video data packet 32 through the router for video-data 14, and carries out operations similar to the aforementioned ones at the steps S1000 to S1003. Thus, the video data packet 32 is transmitted to the wireless video terminal 17A.

When the first receiving part 171A of the wireless video terminal 17A receives the video data packet 32 (step S721), the control part 173 demodulates this video data packet 32 and displays it on the display (not shown) (step S722). Thereafter the wireless video terminal 17A can continuously receive the video data packet 32 from the designated channel 22. When another video data is to be acquired by the wireless video terminal 17A, the video program menu packet 31 may be received again, so that the aforementioned procedure is repeated. At this time, the wireless video terminal 17A transmits the control signal packet 41 to the base-station for control-data 19 without setting the position information registration flag part 415 if the terminal is positioned in the same zone 18B. Therefore, the video server 11 creates the video data packet 32 without carrying out the aforementioned updating of the position information (step S913), and transmits the packet to the base-station for video-data 15 (step S914).

Description is now made on operations of the respective parts of the wireless visual communication system in relation to a wireless video terminal 17 which is positioned in a place belonging to none of the zones 18. Referring to FIG. 6, the wireless video terminal 17B moving from the zone 18B to the unreceivable area cannot receive the video program menu packet 31 which is transmitted by the base-station for video-data 15 controlling the zone 18B, and recognizes that it has gone out of the zone 18B (step S710). Then, the first receiving part 171A of the wireless video terminal 17B tries to adjust its frequency (step S711), but it cannot receive the video program menu packet 31 from any base-station for video-data 15. Thus, the wireless video terminal 17B recognizes that it is positioned in the unreceivablpart 173 oerefore, the control part 173 of the wireless video terminal 17B creates the control signal packet 41 for requesting deletion of the position information to the video server 11, and transmits the packet to the base-station for control-data 19 (step S723). In the requested control signal packet 41, the terminal ID part 411 stores the identification value of the wireless video terminal 17B, while the position information registration flag part 415 stores an indication that deletion of the position information of the wireless video terminal 17B registered in the position storage table part 12 is requested.

The base-station for control-data 19 receives the control signal packet 41 for deletion of the position registration from the wireless video terminal 17B (step S810), and confirms that this control signal packet 41 includes the request for deletion of the position registration (step S815). Then, the base-station for control-data 19 transmits the control signal packet 41 to the video server 11 through the network 13 (step S816).

The video server 11 receives the control signal packet 41 from the base-station for control-data 19 (step S909), stores the contents included in the packet in the history storage table part 20 (step S910), and thereafter checks the program number part 413 and the position information registration flag part 415 of the control signal packet 41, to determine whether this control signal packet 41 is related to a request for deletion of the position information, or a request for video data (step S911). If the position information registration flag part 415 stores information on deletion of the position information, the video server 11 deletes the position registration information which is registered with respect to the wireless video terminal 17B from the postion storage table part 12 (step S915). Thus, the video server 11 can control the wireless video terminal 17 even if the wireless video terminal 17 is positioned in the unreceivable area. If the wireless video terminal 17 moves to the unreceivable area while the wireless video terminal 17 is receiving the video data packet 32 in the previously positioned zone 18, subsequent transmission of the video data packet 32 is in vain. As hereinabove described, the video server 11 can stop transmission of the video data packet 32 by recognizing that the wireless video terminal 17 is positioned in the unreceivable area, thereby eliminating waste transmission. When the wireless video terminal 17 moves to any zone 18 again, the respective parts of this wireless visual communication system carry out operations similar to the above. After the step S915, the video server 11 transmits an instruction for transmission of a picture to the base-station for control-data 19 through the network 13 (step S916).

The base-station for control-data 19 receives the instruction for transmission of a picture from the video server 11 (step S808), and transmits picture information (previously held in the base-station for control-data 19) to the wireless video terminal 17B moving out from the zone 18B (step S809). The picture which is transmitted at this time may have various contents. When the wireless visual communication system is employed in an art gallery or a museum, for example, the picture includes the contents of the current exhibition. When the wireless visual communication system is employed in a theme park, on the other hand, the picture includes the map of the park etc. The contents of the picture may be varied with application of the system.

Each wireless video terminal 17 entering the zone 110 of the base-station for control-data 19 immediately establishes a link for communication with the radio control station 19. This link may be established through a specific frequency for each wireless video terminal 17. Alternatively, one frequency may be time-shared into a plurality of slots, to establish links through the respective slots. In any case, such links are established while preventing radio interference between the wireless video terminals 17. At the aforementioned step S809, the picture is transmitted from the base-station for control-data 19 to the wireless video terminal 17 through this link. Therefore, the wireless video terminal 17B moving out from the zone 18B, for example, independently receives the picture service from the base-station for control-data 19.

The wireless video terminal 17 receiving the picture information from the base-station for control-data 19 displays the picture on the display (not shown). Consequently, the user can receive some information from the system, even if he moves to a position belonging to none of the zones 18.

While the base-station for control-data 19 is provided independently of the video server 11 in the aforementioned embodiment, the function of this base-station for control-data 19 can alternatively be included in the video server 11. In this case, the video server 11 serves as a central unit having a function of processing picture requests and channel setting instructions from the respective wireless video terminals 17 and a function of transmitting the requested pictures, so that the control signal packets 41 are directly transferred between this central unit and the respective wireless video terminals 17.

Figure 12:
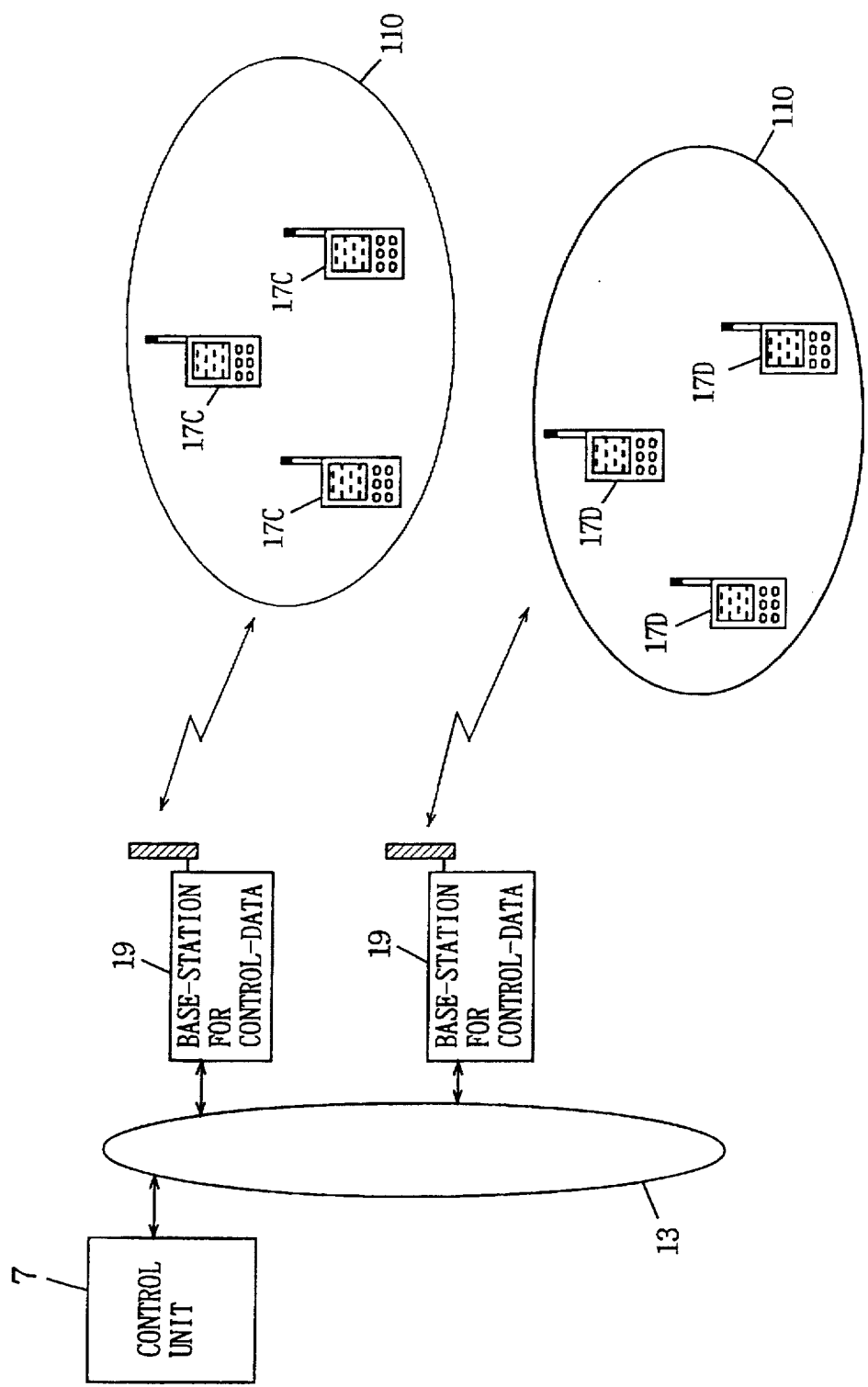
FIG. 12 illustrates the structure of a wireless visual communication system according to a second embodiment of the present invention.
Figure 13:
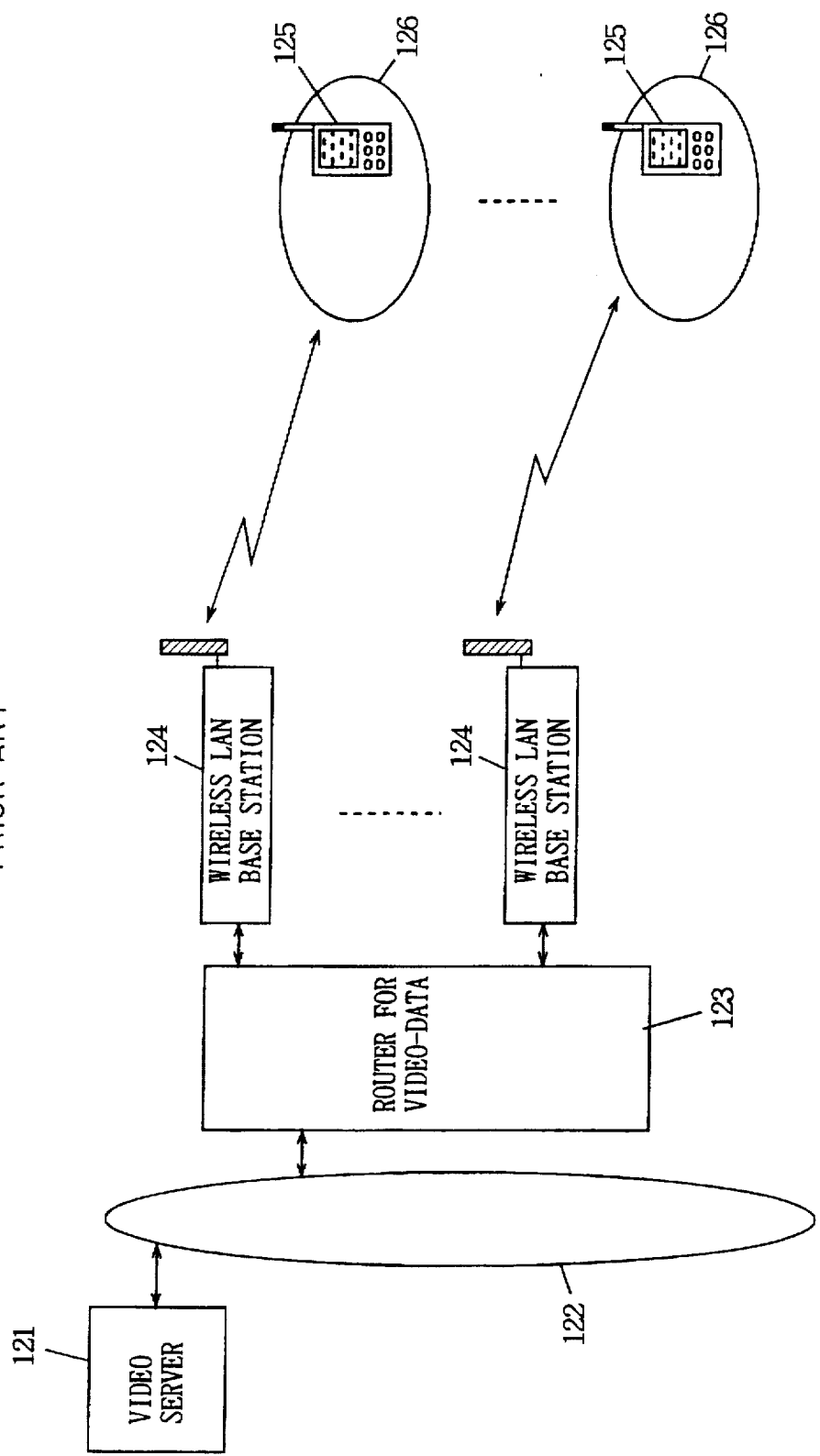
FIG. 13 illustrates a conventional wireless visual communication system.

FIG. 12 is a block diagram showing the overall structure of a wireless visual communication system according to a second embodiment of the present invention. While the video server 11, the position storage table part 12, the router for video-data 14, the base-stations for video-data 15, the menu storage parts 16 and the history storage table part 20 shown in FIG. 1 are not illustrated in FIG. 12 for the purpose of simplification, this embodiment comprises all these structures. Further, this embodiment comprises a plurality of base-stations for control-data 19, along with plurality of sets of routers for video-data 14, base-stations for video-data 15 and menu storage parts 16. Further, this embodiment comprises a control unit 7, in addition to the structure shown in FIG. 1. The control unit 7 creates terminal station control signals for controlling all wireless video terminals 17 in this wireless visual communication system. Further, the control unit 7 controls operations (ON and OFF operations of power sources for the wireless video terminals 17, for example) other than the distribution of video data.

Each base-station for control-data 19, which has its own terminal station control area 110 not overlapping with other ones, receives a control signal packet 41 from each wireless video terminal 17 positioned in its own terminal station control area 110, and transmits this control signal packet 41 to the control unit 7. The base-station for control-data 19 must determine whether the control signal packet 41 is transmitted to the control unit 7 or the video server 11. Therefore, the base-station for control-data 19 transmits the control signal packet 41 to the control unit 7 only when a transmission data part 416 stores information. On the other hand, the control signal packet 41 is transmitted to the video server 11 in the aforementioned case. Further, the base-station for control-data 19 transmits terminal station control signal which is transmitted from the control unit 7 to the wireless video terminal 17. The wireless video terminal 17 carries out processing in response to the contents of the received terminal station control signal. If a control request to the control unit 7 is present, the wireless video terminal 17 stores this control request in the transmission data part 416 of the control signal packet 41 which is created by the same, and transmits the request. The terminal station control signal which is transmitted from the control unit 7 includes not only control signal for a specific wireless video terminal 17 but that for all wireless video terminals 17 positioned in the terminal station control area 110.

The operation of the wireless visual communication system shown in FIG. 12 is now described. The control unit 7 transmits terminal station control signal including a purport of setting a common identification value to each base-station for control-data 19 at need, so that terminal station control signal to all wireless video terminals 17 positioned in the terminal station control area 110 can be transmitted. The base-station for control-data 19 transmits this terminal station control signal to the terminal station control area 110 which is controlled by this base-station for control-data 19. A second receiving part 171B of each wireless video terminal 17 which is positioned in this terminal station control area 110 receives the terminal station control signal. A control part 173 of the wireless video terminal 17 recognizes the common identification value, whereby the common identification value is allotted to the wireless video terminal 17 in addition to the specific identification value. Thus, the control unit 7 groups all wireless video terminals 17 which are positioned in the terminal station control area 110.

As hereinabove described, the base-station for control-data 19 can control any wireless video terminal 17 to which the common identification value is allotted by transmitting terminal station control signal including the common identification value, even if the wireless video terminal 17 is positioned in another zone 18, so far as the same is in the terminal station control area 110. Thus, it is possible to batch-control the wireless video terminals 17 without transmitting terminal station control signals including individual identification values when it is necessary to batch-control grouped wireless video terminals 17 for turning the power sources for the wireless video terminals 17 on or off, for example. Further, each wireless video terminal 17, comprising two receiving parts, can receive the terminal station control signal without hindering receiving of the video data packet 32.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A wireless visual communication system for distributing various video data to a movable terminal station by radio communication, said wireless visual communication system comprising:

a video server for storing a plurality of types of video data;

a base-station for video-data being connected with said video server through a network, for transmitting video data being supplied from said video server to said terminal station through a first radio communication path; and a base-station for control-data, for receiving a control signal being transmitted from said terminal station through a second radio communication path and for informing said video server of said control signal; wherein said terminal station is for announcing a request for video data and the type of said requested video data by transmitting said control signal, said video server is for retrieving corresponding said video data on the basis of said control signal being received from said base-station for control-data and outputting said video data on said network, and relatively wide and narrow bands are allotted to said first and second radio communication paths respectively; and wherein a plurality of communication channels are available for said base-station for video-data in said first radio communication path for transmitting said video data, said terminal station is for further designating a communication channel for receiving said video data by transmitting said control signal, said base-station for video-data is for supervising current conditions of said communication channels, said base-station for control-data is for inquiring of said base-station for video-data about whether said communication channel being designated by said control signal is available upon receiving said control signal, and for transmitting said control signal to said video server if said communication channel is available while requiring said terminal station to re-set a receiving communication channel if said communication channel is unavailable, and said base-station for video-data is for transmitting said video data being supplied from said video server to said terminal station through said communication channel being designated by said terminal station.

2. The wireless visual communication system in accordance with claim 1, further comprising history storage means for storing the history of said control signal being received by said video server as history information.

3. A wireless visual communication system for distributing various video data to a movable terminal station by radio communication, said wireless visual communication system comprising:

a video server for storing a plurality of types of video data;

a base-station for video-data being connected with said video server through a network, for transmitting video data being supplied from said video server to said terminal station through a first radio communication path; and a base-station for control-data, for receiving a control signal being transmitted from said terminal station through a second radio communication path and for informing said video server of said control signal; wherein said terminal station is for announcing a request for video data and the type of said requested video data by transmitting said control signal, said video server is for retrieving corresponding said video data on the basis of said control signal being received from said base-station for control-data and outputting said video data on said network, and relatively wide and narrow bands are allotted to said first and second radio communication paths respectively; and wherein a plurality of said base-stations for video-data are provided with a specific communicable zone for each of said plurality of said base stations for video data respectively, and said base-station for control-data is communicable in an area covering said zones of all said base-stations for video-data.

4. The wireless visual communication system in accordance with claim 3, wherein a frequency band which does not overlap with other frequency bands is fixedly allotted to said plurality of said base-stations for video-data as said first radio communication path, and each of said plurality of said base-stations for video-data is for transmitting video data through a plurality of communication channels being obtained by dividing said fixedly allotted frequency band.

5. The wireless visual communication system in accordance with claim 4, further comprising menu storage means being connected to each of said plurality of said base-stations for video-data, for storing title information of said video data being stored in said video server; wherein each of said plurality of said base-stations for video-data is for transmitting a video program menu being created on the basis of said title information being stored in said menu storage means, an identification value allotted to each of said plurality of said base-stations for video-data, and conditions of said communication channels in said first radio communication path to its corresponding zone through a predetermined one of said plurality of communication channels in said first radio communication path, and said terminal station creates said control signal by referring to a received video program menu, identification value and conditions of said communication channels.

6. The wireless visual communication system in accordance with claim 5, wherein said control signal at least includes:

a video data number part storing an identification value for specifying video data whose distribution is required to said video server, a terminal station ID part storing said identification value being specific to said terminal station, a first transmission/receiving station ID part storing said identification value of said base-station for video-data transmitting said video program menu, and a used channel designating part designating a communication channel for receiving requested said video data;

said base-station for control-data is for inquiring of said base-station for video-data having said identification value being stored in said first transmission/receiving station ID part about whether or not said communication channel being stored in said used channel designating part is available, and is for requiring said terminal station having said identification value being stored in said terminal station ID part to re-set a communication channel when said communication channel is unavailable, while transferring said control signal to said video server when said communication channel is available, and said video server is for referring to said video data number part of a transferred control signal for retrieving corresponding said video data and outputting the same on said network.

7. The wireless visual communication system in accordance with claim 6, further comprising position information storage means for storing said identification value of said terminal station being included in said control signal received by said video server from said base-station for control-data and said identification value of said base-station for video-data as information indicating the current position of said terminal station.

8. The wireless visual communication system in accordance with claim 7, wherein said control signal further includes a position information registration flag part for informing said video server of whether registration of said position information being stored in said position information storage means is requested or deleted, and said video server is for referring to said position information registration flag part of a received control signal for changing the contents of said position information storage means.

9. The wireless visual communication system in accordance with claim 8, wherein said video server is for deleting said position information of said terminal station from said position information storage means when said video server recognizes that said terminal station is not positioned in any zone on the basis of said position information registration flag part being included in a received control signal.

10. The wireless visual communication system in accordance with claim 3, further comprising history storage means for storing the history of said control signal being received by said video server as history information.

11. A wireless visual communication system for distributing various video data to a movable terminal station by radio communication, said wireless visual communication system comprising:

a video server for storing a plurality of types of video data;

a base-station for video-data being connected with said video server through a network, for transmitting video data being supplied from said video server to said terminal station through a first radio communication path; and a base-station for control-data, for receiving a control signal being transmitted from said terminal station through a second radio communication path and for informing said video server of said control signal; wherein said terminal station is for announcing a request for video data and the type of said requested video data by transmitting said control signal, said video server is for retrieving corresponding said video data on the basis of said control signal being received from said base-station for control-data and outputting said video data on said network, and relatively wide and narrow bands are allotted to said first and second radio communication paths respectively; and wherein a plurality of said base-stations for control-data are provided to have specific communicable areas respectively, said wireless visual communication system further comprises a control unit creating terminal station control signals for controlling each said terminal station and transmitting said terminal station control signal through each of said plurality of said base-stations for control-data, and said control unit is for supplying a same common identification value to respective said terminal stations through said terminal station control signal, thereby batch-controlling all said terminal stations being positioned in said communicable areas of all of said plurality of said base-stations for control-data.

12. The wireless visual communication system in accordance with claim 11, wherein said terminal station control signal includes:

an identification value storage part for storing said identification values being specific to respective said terminal stations or said common identification value, and a data storage part for storing data for controlling respective said terminal stations; and said control unit is for independently controlling respective said terminal stations through said terminal station control signal including said identification values being specific to respective said terminal stations, while batch-controlling all said terminal stations being positioned in said communicable areas of all of said plurality of said base-stations for control-data through said terminal station control signal including said common identification value.

\* \* \* \* \*